United States Patent [19]

Kanazawa et al.

[11] Patent Number: 5,082,080
[45] Date of Patent: Jan. 21, 1992

[54] FRONT AND REAR WHEEL TURNING SYSTEM FOR VEHICLE

[75] Inventors: Hirotaka Kanazawa; Hiroshi Ohmura, both of Hiroshima, Japan

[73] Assignee: Mazda Motor Corporation, Hiroshima, Japan

[21] Appl. No.: 735,671

[22] Filed: Jul. 26, 1991

Related U.S. Application Data

[63] Continuation of Ser. No. 485,537, Feb. 27, 1990, abandoned.

[30] Foreign Application Priority Data

Feb. 28, 1989 [JP] Japan ................... 1-49433

[51] Int. Cl.⁵ .................... B62D 5/04; B62D 7/00
[52] U.S. Cl. .................... 180/140; 180/79.1; 180/142; 280/91; 364/424.05
[58] Field of Search ............ 180/140, 142, 79.1; 280/91; 364/424.05

[56] References Cited

U.S. PATENT DOCUMENTS

| | | |
|---|---|---|
| 4,601,357 | 7/1986 | Miyoshi et al. |
| 4,716,981 | 1/1988 | Murao ................... 180/140 |
| 4,740,002 | 4/1988 | Miyoshi ................ 180/142 |
| 4,862,366 | 8/1989 | Morishira ............. 180/142 |
| 4,934,474 | 6/1990 | Sugasawa ........... 364/424.05 |
| 4,979,115 | 12/1990 | Takahashi ............ 180/140 |

*Primary Examiner*—Mitchell J. Hill
*Attorney, Agent, or Firm*—Sixbey, Friedman, Leedom & Ferguson

[57] ABSTRACT

A four-wheel steering system includes a front wheel turning mechanism which turns the front wheels in response to the turning of the steering wheel, a rear wheel turning mechanism which turns the rear wheels in response to the turning of the steering wheel, and a power steering mechanism. The rear wheel turning mechanism changes the rear wheel turning angle ratio, which is the ratio of the rear wheel turning angle to the front wheel turning angle, on the basis of predetermined rear wheel turning angle ratio characteristic curves. The assisting force of the power steering mechanism is changed when the rear wheel turning mechanism fails.

17 Claims, 7 Drawing Sheets

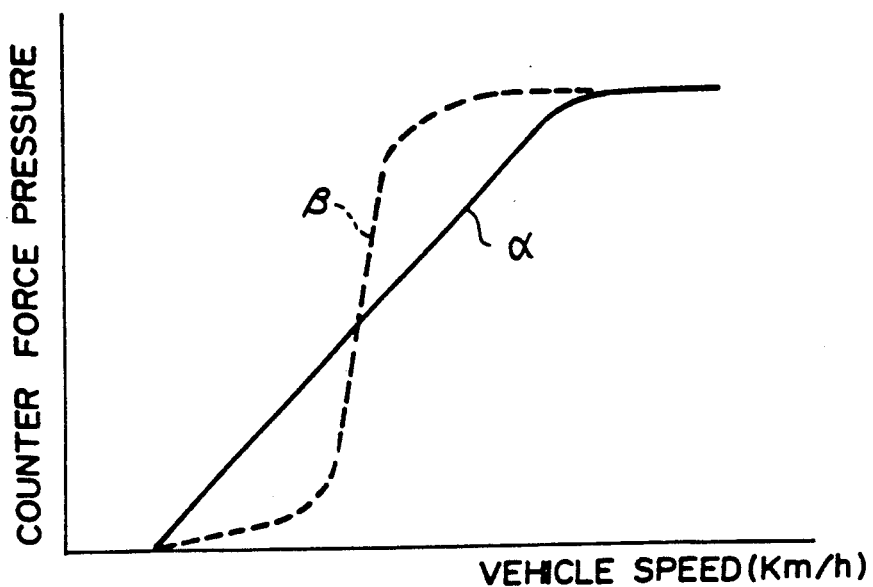
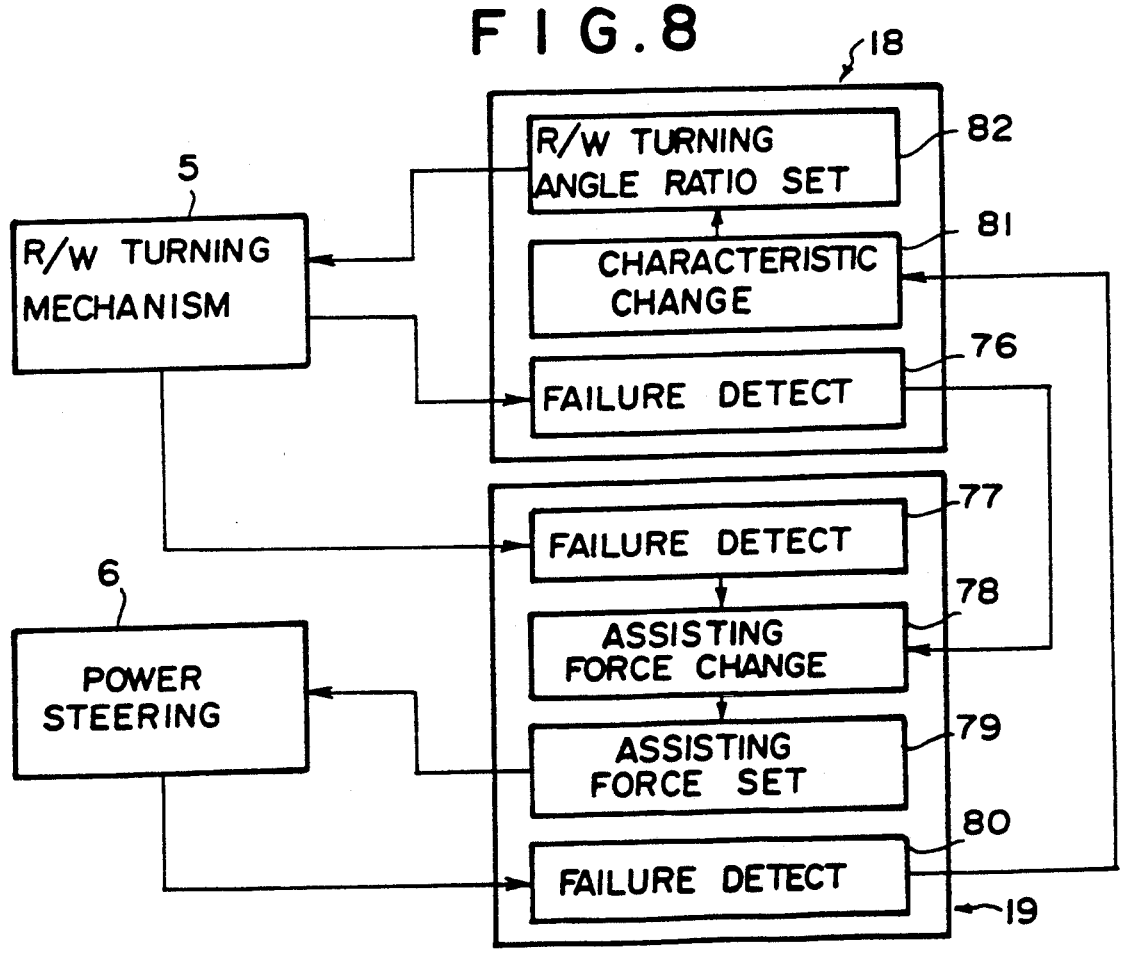

FRONT AND REAR WHEEL TURNING SYSTEM FOR VEHICLE

This application is a continuation of Ser. No. 07/485,537, filed Feb. 27, 1990 now abandoned.

BACKGROUND OF THE INVENTION

1. Field of the Invention

This invention relates to a front and rear wheel turning system for a vehicle in which both the front and rear wheels turn in response to the turning of the steering wheel, and more particularly to such a front and rear wheel turning system which is provided with a power steering mechanism for assisting the driver in turning the steering wheel.

2. Description of the Prior Art

As disclosed in, for instance, U.S. Pat. No. 4,601,357, there has been known a four-wheel steering system in which both the front and rear wheels turn in response to the turning of the steering wheel, the rear wheel turning angle ratio, which is the ratio of the rear wheel turning angle to the front wheel turning angle, being changed on the basis of predetermined rear wheel turning angle ratio characteristic curves. Generally, the rear wheels turn in the direction opposite to the front wheels (the reverse phase) when the vehicle speed is low, which provides a better turning performance, and turn in the same direction as the front wheels (the same phase) when the vehicle speed is high, which improves the running stability of the vehicle.

Some of such four-wheel steering systems are provided with a power steering mechanism which assists the driver in turning the steering wheel.

In the four-wheel steering system having a power steering mechanism, failure of one of the power steering mechanism and the rear wheel turning mechanism can affect the other, and accordingly, it is preferred that each of the power steering mechanism and the rear wheel turning mechanism be controlled in relation to the other.

SUMMARY OF THE INVENTION

In view of the foregoing observations and description, the primary object of the present invention is to provide a front and rear wheel turning system having a front wheel turning mechanism, a rear wheel turning mechanism and a power steering mechanism in which the adverse influence of a failure of the rear wheel turning mechanism or the power steering mechanism on the running stability, the response to the turning of the steering wheel, and the like can be suppressed.

In accordance with one aspect of the present invention, there is provided a front and rear wheel turning system comprising a front wheel turning mechanism which turns a front wheel or front wheels in response to the turning of the steering wheel, a rear wheel turning mechanism which turns a rear wheel or rear wheels in response to the turning of the steering wheel, and a power steering mechanism, the rear wheel turning angle ratio, which is the ratio of the rear wheel turning angle to the front wheel turning angle, being changed on the basis of predetermined rear wheel turning angle ratio characteristic curves, characterized by having a failure detecting means which detects a failure of the rear wheel turning mechanism and an assisting force changing means which changes the assisting force of the power steering mechanism when the rear wheel turning mechanism fails.

Though the present invention is normally applied to a vehicle having a pair of front wheels and a pair of rear wheels, it can also be applied to vehicles having only one front wheel and two or more rear wheels, having two or more front wheels and only one rear wheel, and having more than two front wheels and rear wheels. Accordingly, in this specification, the term "front wheel turning mechanism" should be interpreted as designating a mechanism which turns the front wheel(s) in response to the turning of the steering wheel. Similarly, the term "rear wheel turning mechanism" should be interpreted as designating a mechanism which turns the rear wheel(s) in response to the turning of the steering wheel. Further, the term "rear wheel turning angle ratio" designates the ratio of the turning angle of the rear wheel(s) to the turning angle of the front wheel(s).

In a vehicle which will be given an understeer tendency by a failure of the rear wheel turning mechanism or when the running conditions of the vehicle are such that it will be given an understeer tendency by a failure of the rear wheel turning mechanism, the assisting force changing means increases the assisting force of the power steering mechanism.

On the other hand, in a vehicle which will be given an oversteer tendency by a failure of the rear wheel turning mechanism or when the running conditions of the vehicle are such that it will be given an oversteer tendency by a failure of the rear wheel turning mechanism, the assisting force changing means reduces the assisting force of the power steering mechanism.

In accordance with another aspect of the present invention, there is provided a front and rear wheel turning system comprising a front wheel turning mechanism which turns a front wheel or front wheels in response to the turning of the steering wheel, a rear wheel turning mechanism which turns a rear wheel or rear wheels in response to the turning of the steering wheel, and a power steering mechanism, the rear wheel turning angle ratio, which is the ratio of the rear wheel turning angle to the front wheel turning angle, being changed on the basis of predetermined rear wheel turning angle ratio characteristic curves, characterized by having a failure detecting means, which detects a failure of the power steering mechanism, and a rear wheel turning angle ratio characteristic changing means, which changes which rear wheel turning angle ratio characteristic curve is used when the power steering mechanism fails.

In a vehicle which will be given an oversteer tendency by a failure of the power steering mechanism or when the running conditions of the vehicle are such that it will be given an oversteer tendency by a failure of the power steering mechanism, the rear wheel turning angle ratio characteristic changing means changes the rear wheel turning angle ratio characteristic curve that is used from a first rear wheel turning angle ratio characteristic curve, which conforms to normal running conditions for the vehicle, to a second rear wheel turning angle ratio characteristic curve, which is weighted for the running stability of the vehicle.

On the other hand, in a vehicle which will be given an understeer tendency by a failure of the power steering mechanism or when the running conditions of the vehicle are such that it will be given an understeer tendency by a failure of the power steering mechanism, the rear wheel turning angle ratio characteristic changing means changes the rear wheel turning angle ratio characteristic curve that is used from a first rear wheel turning angle ratio characteristic curve, which conforms to normal running conditions for the vehicle, to a second rear wheel turning angle ratio characteristic curve, which is weighted for heading performance.

BRIEF DESCRIPTION OF THE DRAWINGS

FIG. 7 shows an example of the first and second counterforce characteristic curves, FIG. 8 is a schematic view showing a concrete arrangement of the control unit.

DESCRIPTION OF THE PREFERRED EMBODIMENT

Figure 1:
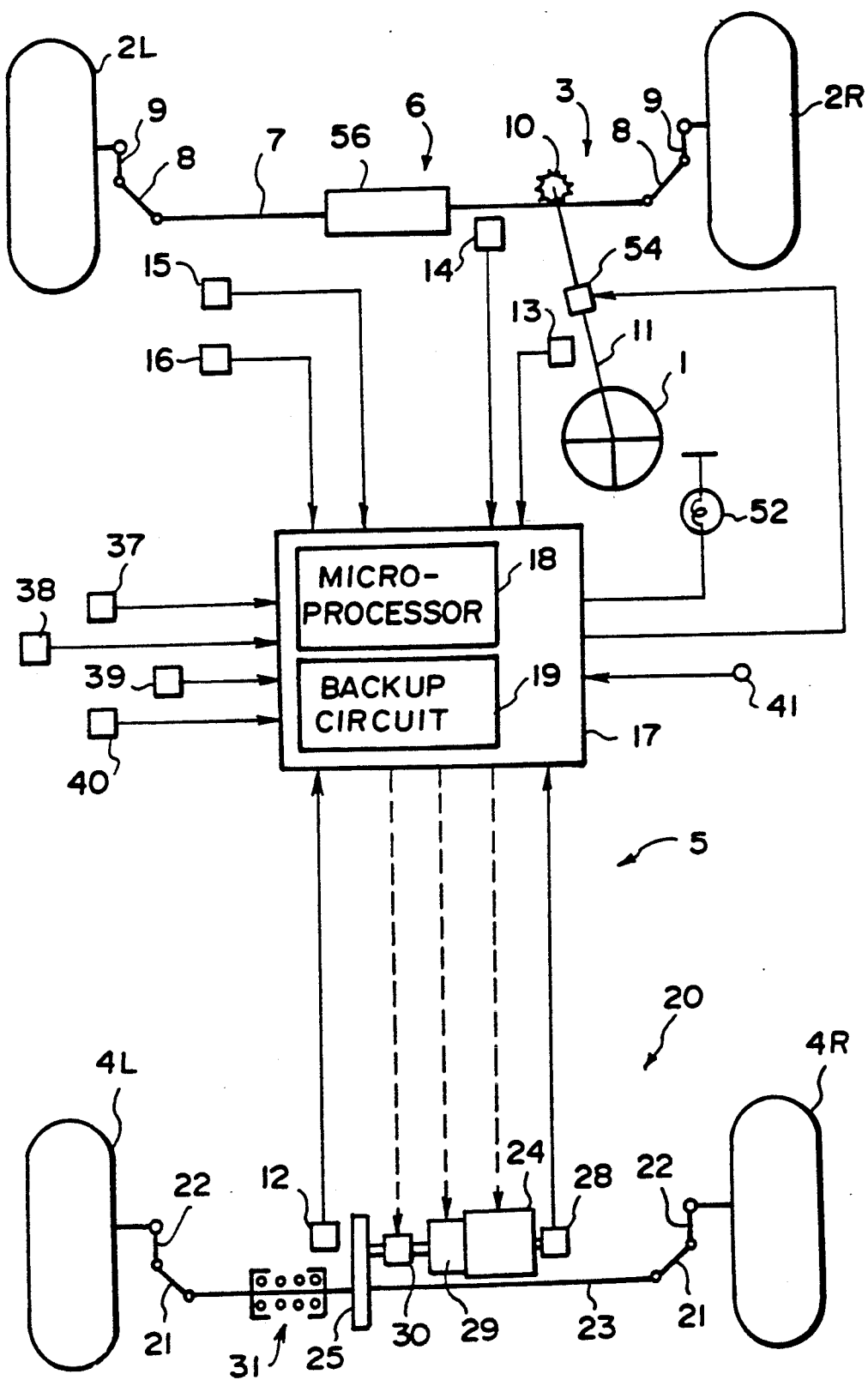
FIG. 1 is a schematic view showing a vehicle provided with a four-wheel steering system in accordance with an embodiment of the present invention.

In FIG. 1, a vehicle provided with a four-wheel steering system in accordance with an embodiment of the present invention comprises a front wheel turning mechanism 3 which turns front wheels 2L and 2R in response to the turning of a steering wheel 1, a rear wheel turning mechanism 5 which turns rear wheels 4L and 4R in response to the turning of the front wheels 2L and 2R, and a power steering mechanism 6 which is associated with the front wheel turning mechanism 3 and assists the driver in turning the steering wheel 1.

The front wheel turning mechanism 3 comprises a front wheel turning rod 7 which extends in the transverse direction of the vehicle body and is provided with a rack which is in mesh with a pinion 10 on the lower end of a steering shaft 11, left and right tie rods 8 connected on opposite ends of the front wheel turning rod 7, and left and right knuckle arms 9 connected between the tie rods 8 and the front wheels 2L and 2R. The front wheel turning rod 7 is slid left and right in response to the turning of the steering wheel 1, whereby the front wheels 2L and 2R are turned.

The rear wheel turning mechanism 5 comprises a control portion and a mechanical portion 20. The control portion includes a rear wheel turning angle sensor 12, a steering wheel turning angle sensor 13, a front wheel turning angle sensor 14, a pair of vehicle speed sensors 15 and 16, and a control unit 17. The control unit 17 comprises microprocessor 18 and a backup circuit 19. The mechanical portion 20 comprises a rear wheel turning rod 23 which is connected to one of the rear wheels 4L and 4R at each end by way of a tie rod 21 and a knuckle arm 22, a servo motor 24 and a reduction gear mechanism 25 which transmits the driving force of the servo motor 24 to the rear wheel turning rod 23.

Figure 2:
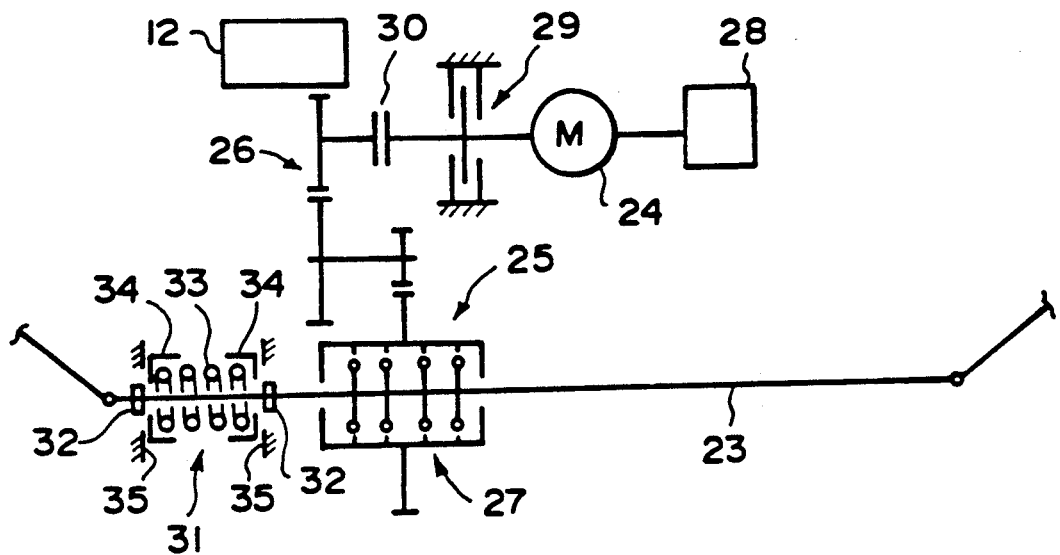
FIG. 2 is a fragmentary schematic view for illustrating the rear wheel turning mechanism.

The servo motor 24 is a stepping motor whose output shaft is connected to the rear wheel turning rod 23 by way of the reduction gear mechanism 25, which comprises a gear train 26 and a ball screw 27 as shown in FIG. 2. The servo motor 24 rotates under the control of the control signal output from the control unit 17, and turns rear wheels 4L and 4R. The turning angle of the rear wheels 4L and 4R is calculated on the basis of a detecting signal, which is output from the rear wheel turning angle sensor 12 which detects the working amount of the reduction gear mechanism 25, and a detecting signal, which is output from the rotary encoder 28 which detects the rotating angle of the servo motor 24. The turning angle of the rear wheels 4L and 4R thus calculated is fed back to the control unit 17 and the control unit 17 uses the feedback signal in its control of the operation of the mechanical portion 20 of the rear wheel turning mechanism 5. A brake 29 is interposed between the servo motor 24 and the reduction gear mechanism 25, and when the rear wheels 4L and 4R are held in a given angular position, the brake 20 prevents the driving force of the servo motor 24 from being transmitted to the reduction gear mechanism 25.

Further, a clutch 30 is interposed between the servo motor 24 and the reduction gear mechanism 25. A rear wheel neutralizing means 31 is provided on the rear wheel turning rod 23 and returns the rear wheels 4L and 4R to the straight-ahead position when the clutch 30 is disengaged. The rear wheel neutralizing means 31 comprises a pair of holders 32 fixed to the rear wheel turning rod 23 a predetermined distance from each other, a centering spring 33 disposed between the holders 32, a pair of retainers 34 mounted on opposite sides of the centering spring 33, and a pair of stoppers 35 fixed to the vehicle body on opposite sides of the spring 33. When the rear wheels 4L and 4R are in the straight-ahead position, the retainers 34 abut against the respective stopper 35, and when the rear wheel turning rod 23 slides left or right, one of retainers 34 moves away from the corresponding stopper 35 while compressing the centering spring 33 so that the spring 33 urges the rear wheel turning rod 23 toward the neutral position (in which the rear wheels 4L and 4R are held in the straight-ahead position).

The control unit 17 reads out the rear wheel turning angle ratio, i.e., the ratio of the rear wheel turning angle to the front wheel turning angle, which is based on the present vehicle speed and a preset rear wheel turning angle ratio characteristic curve and outputs a control signal to the servo motor 24. That is, the control unit 17 detects the turning angle of the front wheels 2L and 2R and the present vehicle speed from the detecting signal output from the steering wheel turning angle sensor 13, which detects the turning angle of the steering wheel 1, and the detecting signal output from the vehicle speed sensor 15, which detects the rotating speed of the front wheels 2L and 2R. Then the control unit 17 reads out a target turning angle for the rear wheels 4L and 4R based on these values and the preset rear wheel turning angle ratio characteristic curve, and outputs a control signal corresponding to the target turning angle of the rear wheels 4L and 4R to the servo motor 24. At the same time, the control unit 17 constantly follows the position of the servo motor 24 by means of the signal from the rotary encoder 28, thereby effecting control of the turning angle of the rear wheels 4L and 4R.

Figure 3:
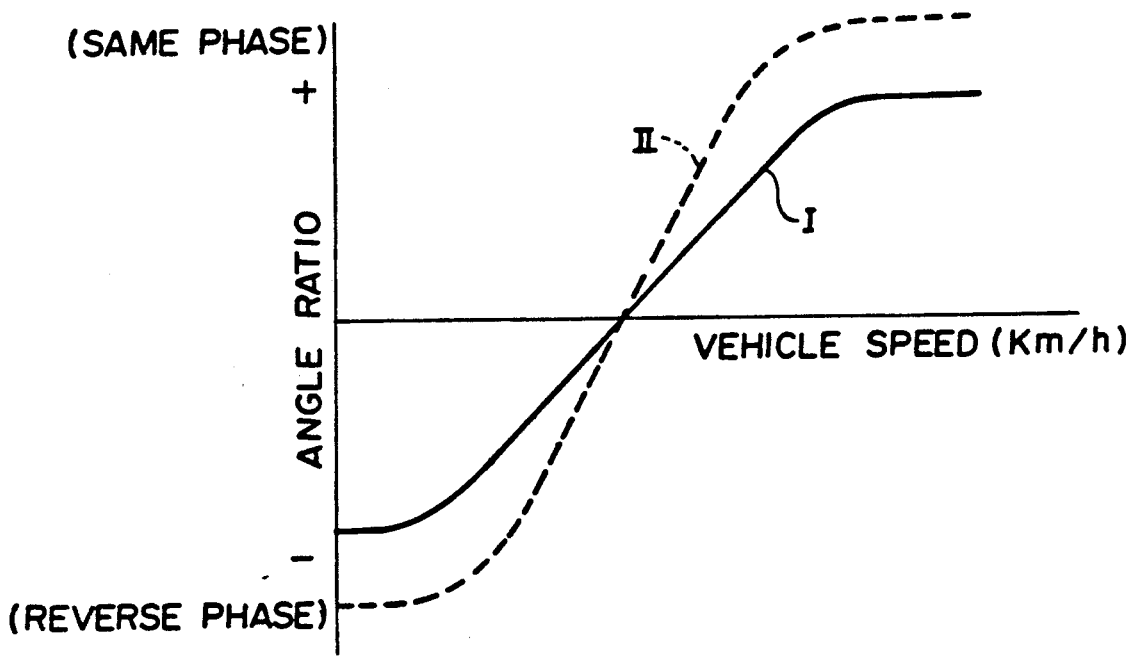
FIG. 3 is a view showing the rear wheel turning angle ratio characteristic curves.

The rear wheel turning angle ratio characteristic curve which conforms to normal running conditions for the vehicle is shown by line I in FIG. 3; this curve is designated as the first rear wheel turning angle characteristic curve. A second rear wheel turning angle characteristic curve (shown by line II in FIG. 3) conforms to a particular set of running conditions for the vehicle. In the first rear wheel turning angle ratio characteristic curve, the rear wheel turning angle ratio is negative (i.e., the rear wheels 4L and 4R are turned in the direction opposite to the front wheels 2L and 2R) when the vehicle speed is low, which improves the heading performance of the vehicle; the rear wheel turning ratio becomes positive (i.e., the rear wheels 4L and 4R are turned in the same direction as the front wheels 2L and 2R) as the vehicle speed increases, which improves the running stability at high speed. In the second rear wheel turning angle ratio characteristic curve, the absolute values of the rear wheel turning angle ratio in the negative range are larger than those in the first rear wheel turning angle ratio characteristic curve, which further improves the heading performance at low speed. At the same time, the absolute values of the rear wheel turning angle ratio in the positive range are larger in the second rear wheel turning angle ratio characteristic curve than in the first rear wheel turning angle ratio characteristic curve which further improves the running stability at high speed. Normally the rear wheels 4L and 4R are turned in accordance with the first rear wheel turning angle ratio characteristic curve, and if the power steering mechanism 6 fails, the value of the rear wheel turning angle ratio is taken not from the first rear wheel turning angle ratio characteristic curve but from the second rear wheel turning angle ratio characteristic curve as will be described in detail later.

Each of the means for detecting the operating conditions of the vehicle for controlling the rear wheel turning mechanism 5 is of a double-structure for the purpose of making them fail-safe. That is, as shown in FIG. 1, the front wheel turning angle sensor 14, which detects the turning angle of the front wheels 2L and 2R through the displacement of the front wheel turning rod 7, is provided in addition to the steering wheel turning angle sensor 13, the vehicle speed sensor 16, which detects the vehicle speed through the rotating speed of the crankshaft, is provided in addition to the vehicle speed sensor 15, and the rear wheel turning angle sensor 12, which detects the turning angle of the rear wheels 4L and 4R through the working amount of the reduction gear mechanism 25, is provided in addition to the rotary encoder 28. For example, when the turning angle of the front wheels 2L and 2R indicated by the detecting signal from the steering wheel turning angle sensor 13 largely differs from that indicated by the detecting signal from the front wheel turning angle sensor 14, it is determined that one of the sensors has failed and predetermined measures are taken, e.g., the rear wheels 4L and 4R are returned to the straight-ahead position.

Figure 4:
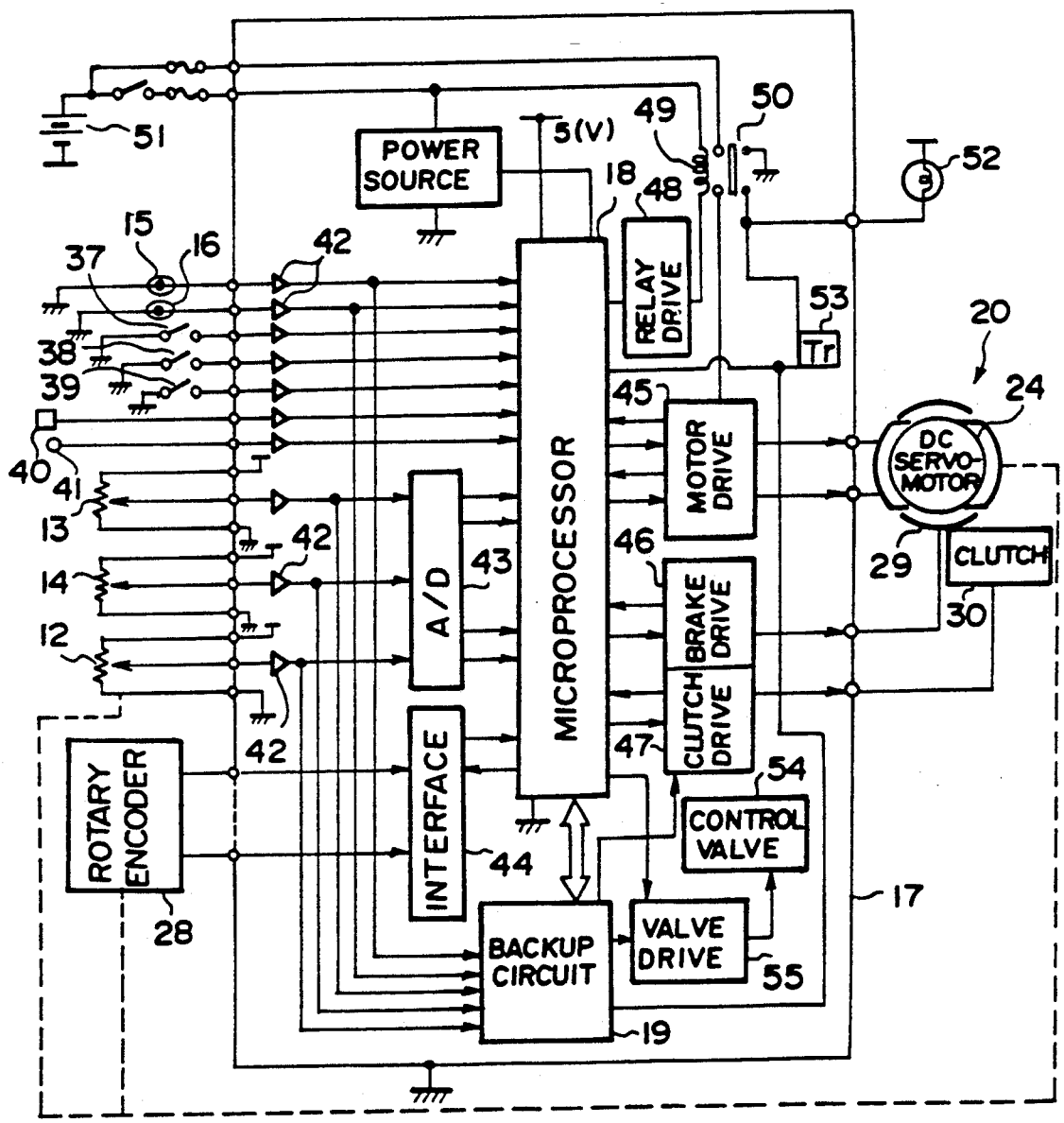
FIG. 4 is a block diagram showing the control unit.

In FIG. 4, reference numeral 37 denotes a neutral switch which is used when the four-wheel steering system of this embodiment is incorporated in a manual transmission vehicle and which detects that the shift lever is in neutral or the clutch pedal is depressed. Reference numeral 38 denotes an inhibitor switch 38 which is used when the four-wheel steering system of this embodiment is incorporated in an automatic transmission vehicle which detects that the selector lever is in N or P. Reference numeral 39 denotes a brake switch which detects that the brake pedal is depressed. Reference numerals 40 and 41 respectively denote an engine switch which detects that the engine is working and an L-terminal which detects that the alternator is working. The signals which are output from these switches 37 to 40 and the L-terminal 41 are input into the control unit 17. That is, as shown in FIG. 4, the output signals from the vehicle speed sensors 15 and 16, the switches 37 to and the L-terminal 41 are input into the microprocessor 18 of the control unit 17 by way of a buffer 42. The output signals from the steering wheel turning angle sensor 13, the front wheel turning angle sensor 14 and the rear wheel turning angle sensor 12 are input into the microprocessor 18 by way of the buffer 42 and an A/D converter 43. The output signal from the rotary encoder 28 is input into the microprocessor 18 by way of an interface 44.

The control unit 17 starts to operate in response to the output signal from the L-terminal 41, and control signals generated by the microprocessor 18 are transmitted to the servo motor 24 by way of a motor control circuit 45, to the brake 29 by way of a brake driving circuit 46 and to the clutch 30 by way of a clutch driving circuit 47.

When the microprocessor 18 determines on the basis of the output signals from the various detecting means that some part of the control system has failed, the microprocessor 18 outputs control signals which cause a relay driving circuit 48 to de-energize a winding 49 of a relay 50 and cause a clutch driving circuit 47 to disengage the clutch 30. When the winding 49 is deenergized, power supplied from a battery 51 to the motor driving circuit 45 is cut, and an alarm lamp 52 is turned on. Further, when the clutch 30 disengages, the rear wheels 4L and 4R are returned to the straight-ahead position by way of the neutralizing means 31. If the failure is of a type that will not adversely affect the control of the servo motor 24, the microprocessor 18 causes current to flow into the base of a transistor 53, thereby turning on the alarm lamp 52, and causes the servo motor 24 to return the rear wheels 4L and 4R to the straight-ahead position.

Said backup circuit 19, which is independent of the microprocessor 18, interrupts the operation of the microprocessor 18 when the microprocessor 18 itself fails. That is, the detecting signals from the sensors 12 to 16 are input into the backup circuit 19, and the backup circuit 19 determines, on the basis of the detecting signals and separately from the microprocessor 18, whether the rear wheel turning mechanism 5 is operating correctly according to the running conditions of the vehicle. If it is determined that the rear wheel turning mechanism 5 is not operating correctly, the backup circuit 19 turns on the alarm lamp 52 and outputs a control signal which causes the clutch 30 to disengage, whereby the rear wheels 4L and 4R return to the straight-ahead position under the force of the neutralizing means 31.

Further, the backup circuit 19 outputs a high or low signal to the microprocessor 18 and the microprocessor 18 outputs to the backup circuit 19 a signal corresponding to the signal the backup circuit 19 outputs. Thus the backup circuit 19 watches the microprocessor 18 and if the microprocessor 18 fails, the backup circuit 19 outputs to the mechanical portion 20 a control signal which resets the rear wheel turning control by the microprocessor 18.

Further, the backup circuit 19 controls the assisting force of the power steering mechanism 6 according to the operating condition and the speed of the vehicle.

That is, the backup circuit 19 outputs a control signal to a valve driving circuit 55 which controls a control valve 54 of the power steering mechanism 6.

Figure 5:
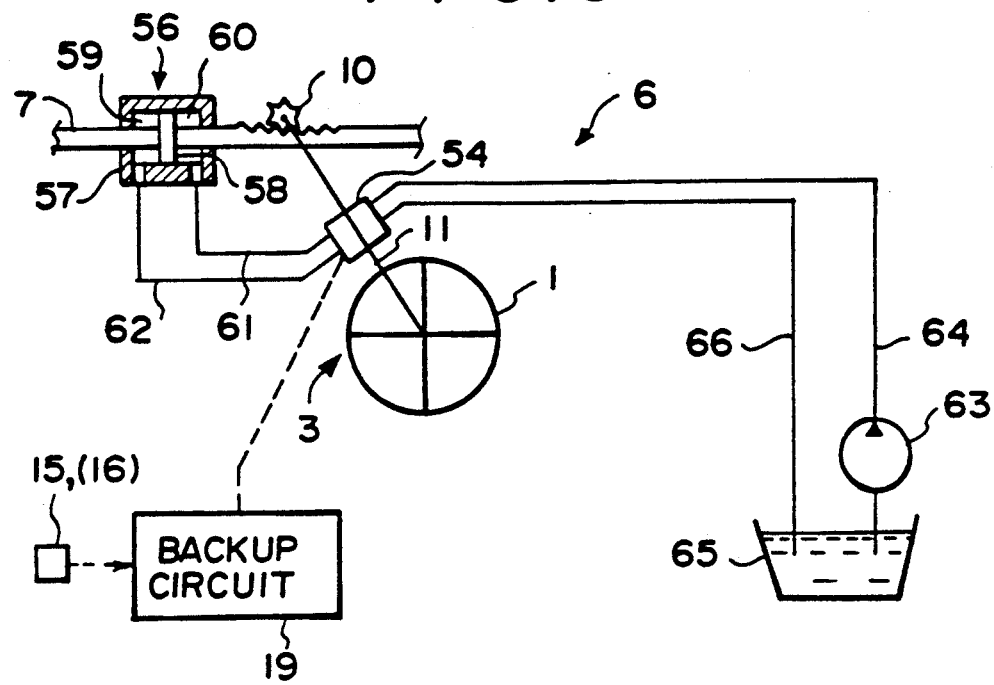
FIG. 5 is a fragmentary schematic view for illustrating the power steering mechanism.

As shown in FIG. 5, the power steering mechanism 6 includes a cylinder mechanism 56 which is mounted on the front wheel turning rod 7. The cylinder mechanism 56 comprises a cylinder 57 and a piston 58, which is formed integrally with the front wheel turning rod 7 and divides the space in the cylinder 57 into left and right hydraulic pressure chambers 59 and 60. The hydraulic pressure chambers 59 and 60 are connected, respectively by way of pipes 61 and 62, to a control valve 54 on the steering shaft 11. A pipe 64 which extends from the discharge side of an oil pump 63 and a pipe 66 which communicates with a reservoir 65 are connected to the control valve 54.

Figure 6:
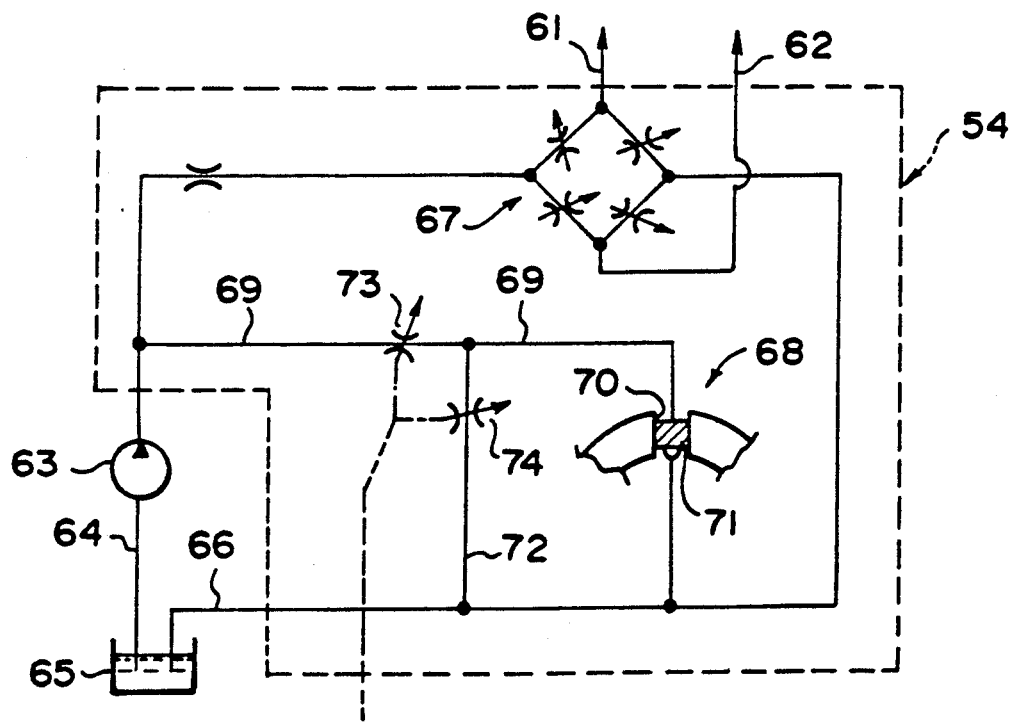
FIG. 6 is a schematic view showing the control valve.

As shown in FIG. 6, the control valve 54 comprises a switching valve 67 and a counterforce mechanism 68. The switching valve 67 determines which of the chambers 59 and 60 the hydraulic oil is to be fed to according to the direction in which the steering wheel 1 is turned. The counterforce mechanism 68 comprises a pressure chamber 70 and a piston 71 which moves under the pressure in the pressure chamber 70. The pressure chamber 70 communicates with a pipe 69 which branches off from the pipe 64. As the pressure in the pressure chamber 70 increases, the restraint force acting on a torsion bar which is connected to the steering wheel 1 increases. That is, as the vehicle speed increases, the assisting force of the power steering mechanism 6 is weakened. The pipe 69 communicates with a relief pipe 66 by way of a branch pipe 72. The pipe 69 and the branch pipe 72 are respectively provided with variable constrictions 73 and 74 which interlock with each other and form a counterforce pressure changing means.

Normally the openings of the variable constrictions 73 and 74 change with the vehicle speed. More particularly, the opening of the constriction 73 becomes larger as the vehicle speed increases while the opening of the constriction 74 becomes smaller as the vehicle speed increases. With this arrangement, the pressure in the pressure chamber 70 increases to weaken the assisting force of the power steering mechanism 6 as the vehicle speed increases. That is, a counterforce setting means provided in the backup circuit 19 determines the value of the counterforce pressure to be produced in the counterforce mechanism 68 on the basis of the preset counterforce characteristic curve and the present vehicle speed which is determined on the basis of the signals from the vehicle speed sensors 15 and 16, and thus a control signal which corresponds to the value of the counterforce pressure to be produced is output to the variable constrictions 73 and 74 and controls the openings of the constrictions 73 and 74.

A first counterforce characteristic curve, which is shown by the solid line α in FIG. 7, conforms to normal running conditions for the vehicle, and a second counterforce characteristic curve, which is shown by the broken line β in FIG. 7, conforms to a particular set of running conditions which are different from the normal running conditions. In the first counterforce characteristic curve, the counterforce pressure increases substantially in proportion to the vehicle speed so that the assisting force of the power steering mechanism 6 is weakened when the vehicle speed is high. On the other hand, in the second counterforce characteristic curve, the counterforce pressure gradually increases as the vehicle speed increases in the low vehicle speed range, and abruptly increases when the vehicle speed reaches a predetermined value so that the assisting force of the power steering mechanism 6 in the low vehicle speed range is stronger when the counterforce is controlled according to the second counterforce characteristic curve than when the counterforce is controlled according to the first counterforce characteristic curve.

The counterforce follows the second counterforce characteristic curve when the rear wheel turning mechanism 5 fails. That is, as shown in FIG. 8, the microprocessor 18 includes a rear wheel turning angle setting section 82, a rear wheel turning angle ratio characteristic changing section 81, and a failure detecting section 76 which detects a failure in the rear wheel turning mechanism 5, and the backup circuit 19 includes another failure detecting section 77 which detects a failure in the rear wheel turning mechanism 5, an assisting force changing section 78, an assisting force setting section 79 and a failure detecting section 80 which detects a failure in the power steering mechanism 6. When the failure detecting section 76 or 77 detects that the rear wheel turning mechanism 5 has failed, the assisting force changing section 79 in the backup circuit 19 outputs a control signal which causes the assisting force setting section 79 to follow the second counterforce characteristic curve instead of the first counterforce characteristic curve. The failure detecting section 80 in the backup circuit 19 detects a failure in the power steering mechanism 6 by checking the pressure of hydraulic oil fed from the pump 63 of the power steering mechanism 6, the operating condition of the control valve 54, the detecting condition of the vehicle speed sensors 15 and 16, and the like. When the failure detecting section 80 detects that the power steering mechanism has failed, the rear wheel turning angle ratio characteristic changing section 81 outputs a control signal which causes the rear wheel turning angle setting section 82 to follow the second rear wheel turning angle ratio characteristic curve II (FIG. 3) instead of the first rear wheel turning angle ratio characteristic curve I.

By changing from the first counterforce characteristic curve to the second counterforce characteristic curve and by changing the assisting force of the power steering mechanism 6 when the rear wheel turning mechanism 5 fails, deterioration of the heading performance and the running stability of the vehicle due to the failure can be suppressed.

That is, when the rear wheel turning mechanism 5 fails, the rear wheels 4L and 4R are held in the straight-ahead position irrespective of the front wheel turning angle, and accordingly, the improvement of the heading performance which is obtained when the rear wheels 4L and 4R are turned in the direction opposite to the front wheels 2L and 2R in the low vehicle speed range cannot be enjoyed any more. Accordingly, when the rear wheel turning mechanism 5 fails, the steering system comes to exhibit an understeer tendency in the low vehicle speed range compared with when the rear wheel turning mechanism 5 is in the normal state. However, this tendency can be suppressed by increasing the assisting force of the power steering mechanism 6 in the low vehicle speed range so that the steering wheel 1 can be turned with a lighter force.

Further, when the rear wheel turning mechanism 5 fails, the rear wheels 4L and 4R are held in the straight-ahead position irrespective of the front wheel turning angle, and accordingly, the improvement of the running stability which is obtained when the rear wheels 4L and 4R are turned in the same direction as the front wheels 2L and 2R in the high vehicle speed rang cannot be enjoyed any more. The steering system thus comes to exhibit an oversteer tendency in the high vehicle speed range compared with when the rear wheel turning mechanism 5 is in the normal state. However, this tendency can be suppressed by reducing the assisting force of the power steering mechanism 6 in the high vehicle speed range so that more force is required to turn the steering wheel 1.

Figure 9:
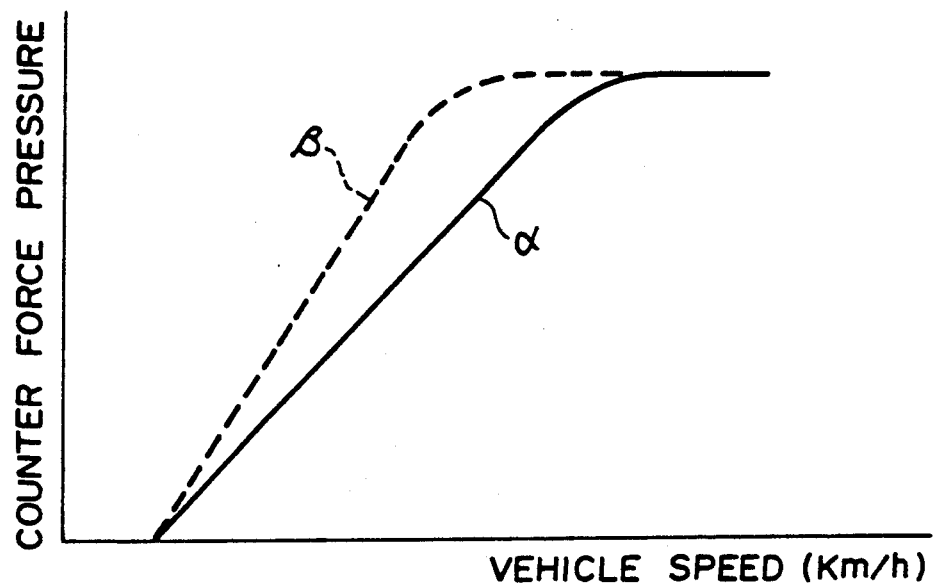
FIGS. 9 and 10 show other examples of first and second counterforce characteristic curves.
Figure 10:
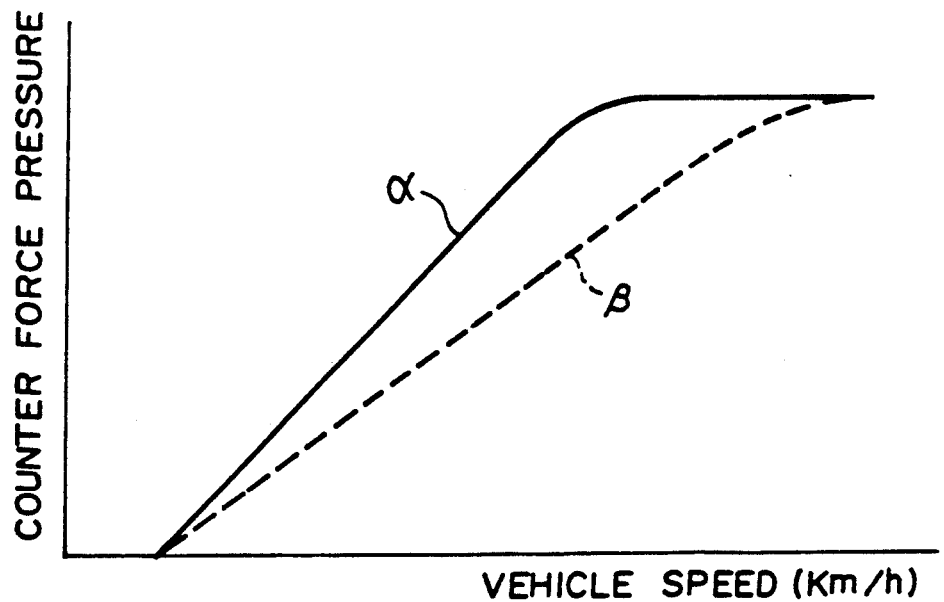

The second counterforce characteristic curve which is used in the case of a failure in the rear wheel turning mechanism 5 need not be limited to that shown in FIG. 7 but may be modified in various ways. For example, for a vehicle whose steering system will exhibit an oversteer tendency over the entire speed range when the rear wheel turning mechanism 5 fails, the second counterforce characteristic curve may be set such that the rate at which the counterforce pressure increases with an increase in the vehicle speed is higher than the rate in the first counterforce characteristic curve as shown in FIG. 9, thereby weakening the assisting force of the power steering mechanism 6 when the rear wheel turning mechanism 5 fails. On the other hand, for a vehicle whose steering system will exhibit an understeer tendency over the entire speed range when the rear wheel turning mechanism 5 fails, the second counterforce characteristic curve may be set such that the rate at which the counterforce pressure increases with an increase in the vehicle speed is lower than in the first counterforce characteristic curve as shown in FIG. 10, thereby increasing the assisting force of the power steering mechanism 6 when the rear wheel turning mechanism 5 fails.

By changing from the first rear wheel turning angle ratio characteristic curve to the second rear wheel turning angle ratio characteristic curve when the power steering mechanism 6 fails, deterioration of the response of the rear wheels to the turning of the steering wheel and the running stability of the vehicle due to the failure can be suppressed.

That is, when the power steering mechanism 6 fails, the driver is not given the assisting force of the power steering mechanism 6 and the driver has to exert more force to turn the steering wheel 1, especially in the low vehicle speed range. Accordingly, when the power steering mechanism 6 fails, the steering system comes to exhibit an understeer tendency in the low vehicle speed range compared with when the power steering mechanism 6 is in the normal state. However, this tendency can be suppressed by changing the rear wheel turning angle ratio characteristic curve that is used so that when such a failure occurs the absolute values of the rear wheel turning angle ratio are larger in the low vehicle speed range where the rear wheels 4L and 4R are turned in the direction opposite to the front wheels 2L and 2R, thereby enhancing the heading or turning performance in the low vehicle speed range.

Further, when the power steering mechanism 6 fails, the assisting force weakening effect cannot be obtained in the high vehicle speed range. Accordingly, when the power steering mechanism 6 fails, the steering system comes to exhibit an oversteer tendency in the high vehicle speed range compared with when the power steering mechanism 6 is in the normal state. However, this tendency can be suppressed by changing the rear wheel turning angle ratio characteristic curve that is used so that the absolute values of the rear wheel turning angle ratio are larger in the high vehicle speed range where the rear wheels 4L and 4R are turned in the same direction as the front wheels 2L and 2R (in the same phase range), thereby improving the running stability in the high vehicle speed range.

Figure 11:
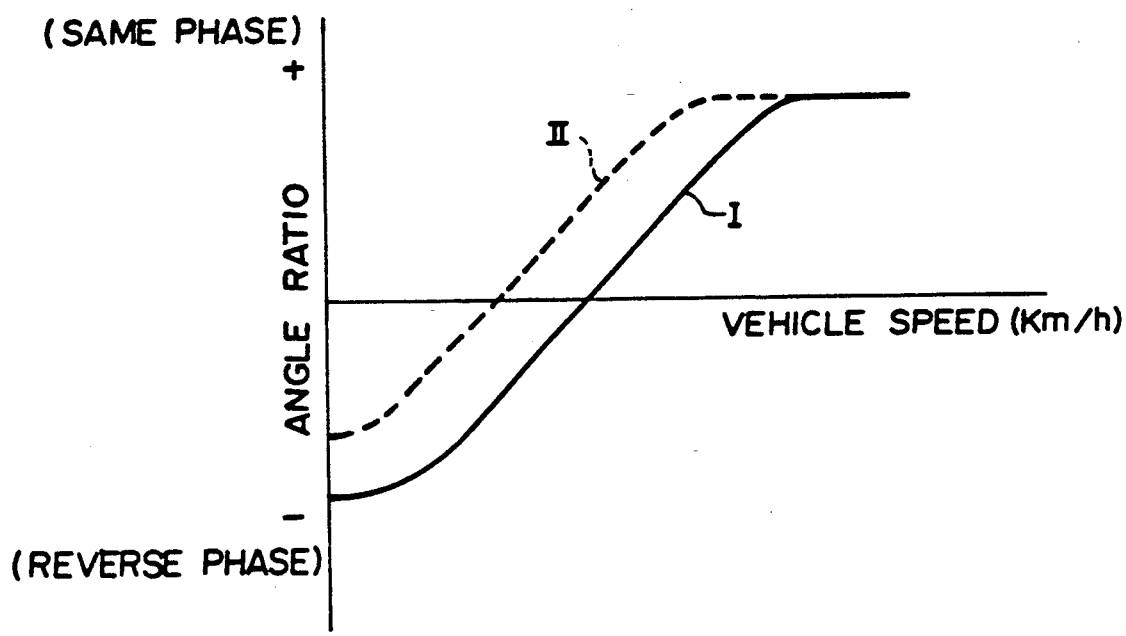
FIGS. 11 and 12 show other examples of first and second rear wheel turning angle ratio characteristic curves.
Figure 12:
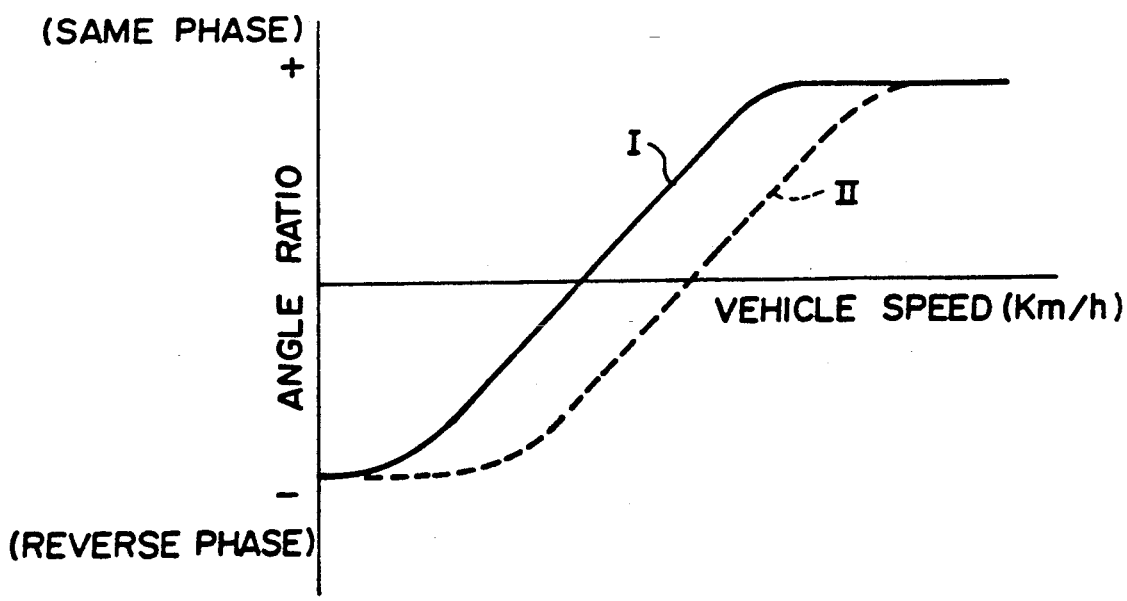

The second rear wheel turning angle ratio characteristic curve which is used in the case of a failure in the power steering mechanism 6 need not be limited to that shown in FIG. 3 but may be modified in various ways. For example, for a vehicle whose steering system will exhibit an oversteer tendency over the entire speed range when the power steering mechanism 6 fails, the second rear wheel turning angle ratio characteristic curve may be set such that the rear wheels 4L and 4R come to be turned in the same direction as the front wheels 2L and 2R at a lower vehicle speed and the absolute value of the rear wheel turning angle ratio for a given vehicle speed in the reverse phase range becomes smaller as shown in FIG. 11, thereby improving the running stability. On the other hand, for a vehicle whose steering system will exhibit an understeer tendency over the entire speed range when the power steering mechanism 6 fails, the second rear wheel turning angle ratio characteristic curve may be set such that the rear wheels 4L and 4R come to be turned in the same direction as the front wheels 2L and 2R at a higher vehicle speed and the absolute value of the rear wheel turning angle ratio for a given vehicle speed in the reverse phase range becomes larger as shown in FIG. 12.

In the embodiment described above, the backup circuit 19 which watches the microprocessor 18 also functions as the assisting force control means. Accordingly, the overall structure is simplified as compared with an arrangement in which the assisting force control means is provided separately from the backup circuit 19.

We claim:

1. A front and rear wheel turning system for a vehicle comprising a front wheel turning mechanism which turns a front wheel in response to the turning of a steering wheel so that the turning angle of the front wheel is directly proportion to the rotational angle of the steering wheel, a rear wheel turning mechanism with turns a rear wheel in response to the turning of the steering wheel, and a power steering mechanism for providing an assisting force for assisting the front wheel turning mechanism in turning the front wheel at a turning angle which is directly proportional to the rotational angle of the steering wheel such that the assisting force eases turning of the steering wheel while the directly proportional relationship between the turning angle of the front wheel and the rotational angle of the steering wheel is maintained, a rear wheel turning angle ratio, which is the ratio of the wear wheel turning angle to the front wheel turning angle, being changed on the basis of predetermined rear wheel turning angle ratio characteristic curves, said front and rear wheel turning system further comprising, a failure detecting means which detects a failure of the rear wheel turning mechanism and an assisting force changing means which changes the assisting force of the power steering mechanism when the rear wheel turning mechanism fails.

2. A front and rear wheel turning system as defined in claim 1 in which said assisting force changing means increases the assisting force of the power steering mechanism at least in a low vehicle speed range when the rear wheel turning mechanism fails.

3. A front and rear wheel turning system as defined in claim 2 in which said power steering mechanism is arranged so that its assisting force is reduced with an increase in the vehicle speed according to a first assisting force characteristic curve when the rear wheel turning mechanism is in a normal state, the assisting force being reduced substantially in proportion to the vehicle speed according to the first assisting force characteristic curve.

4. A front and rear wheel turning system as defined in claim 3 in which said assisting force changing means causes the power steering mechanism to reduce the assisting force with an increase in the vehicle speed according to a second assisting force characteristic curve when the rear wheel turning mechanism fails, the assisting force, according to the second assisting force characteristic curve, being gradually reduced with an increase in the vehicle speed in the low vehicle speed range, and being abruptly reduced when the vehicle speed reaches a predetermined value so that the assisting force of the power steering mechanism in the low vehicle speed range is stronger when the assisting force is reduced according to the second assisting force characteristic curve than when it is reduced according to the first assisting force characteristic curve.

5. A front and rear wheel turning system as defined in claim 3 in which said assisting force changing means causes the power steering mechanism to reduce the assisting force with an increase in the vehicle speed according to a second assisting force characteristic curve when the rear wheel turning mechanism fails, the assisting force, according to the second assisting force characteristic curve, being reduced with an increase in the vehicle speed at a lower rate than when the first assisting force characteristic curve is used.

6. A front and rear wheel turning system as defined in claim 1 in which said assisting force changing means reduces the assisting force of the power steering mechanism at least in a high vehicle speed range when the rear wheel turning mechanism fails.

7. A front and rear wheel turning system as defined in claim 6 in which said assisting force changing means causes the power steering mechanism to reduce the assisting force with an increase in the vehicle speed according to a second assisting force characteristic curve when the rear wheel turning mechanism fails, the assisting force, according to the second assisting force characteristic curve, being reduced with an increase in the vehicle speed at a faster rate than when the first assisting force characteristic curve is used.

8. A front and rear wheel turning system for a vehicle comprising a front wheel turning mechanism which turns a front wheel in response to the turning of a steering wheel so that the turning angle of the front wheel is directly proportional to the rotational angle of the steering wheel, and a power steering mechanism for providing an assisting force for assisting the front wheel turning mechanism in turning the front wheel at a turning angle which is directly proportional to the rotational angle of the steering wheel such that the assisting force eases turning of the steering wheel while the directly proportional relationship between the turning angle of the front wheel and the rotational angle of the steering wheel is maintained, and rear wheel turning assisting means for providing an assisting force for turning the rear wheels, said rear wheel turning assisting means being independent from said power steering mechanism, a rear wheel turning angle ratio, which is the ratio of the rear wheel turning angle to the front wheel turning angle, being changed on the basis of a selected rear wheel turning angle characteristic curve of a plurality of rear wheel turning angle ratio characteristic curves, said front and rear wheel turning system further comprising:
a failure detecting means which detects a failure of the power steering mechanism and
a rear wheel turning angle ratio characteristic changing means which determines which rear wheel turning angle ratio characteristic curve is selected when the power steering mechanism fails.

9. A front and rear wheel turning system as defined in claim 8 in which said rear wheel turning angle ratio characteristic changing means changes from a first rear wheel turning angle ratio characteristic curve, which conforms to normal running conditions for the vehicle, to a second rear wheel turning angle ratio characteristic curve, which is determined to increase running stability.

10. A front and rear wheel turning system as defined in claim 8 in which said rear wheel turning angle ratio characteristic changing means changes form a first rear wheel turning angle ratio characteristic curve, which conforms to normal running conditions for the vehicle, to a second rear wheel turning angle ratio characteristic curve, which is determined to increase turning performance.

11. The front and rear wheel turning system of claim 8, wherein the power steering mechanism includes a hydraulic system, and the rear wheel turning assisting means comprises an electronic system.

12. The front and rear wheel turning system of claim 11, wherein the rear wheel turning assisting means includes a servomotor.

13. A front and rear wheel turning system for a vehicle comprising a front wheel turning mechanism which turns a front wheel in response to the turning of a steering wheel so that the turning angle of the front wheel is directly proportional to the rotational angle of the steering wheel, a rear wheel turning mechanism which turns a rear wheel in response to the turning of the steering wheel, and a power steering mechanism for providing an assisting force for assisting the front wheel turning mechanism in turning the front wheel at a turning angle which is directly proportional to the rotational angle of the steering wheel such that the assisting force eases turning of the steering wheel while the directly proportional relationship between the turning angle of the front wheel and the rotational angle of the steering wheel is maintained, and rear wheel turning assisting means for providing an assisting force for turning the rear wheels, said rear wheel turning assisting means being independent from said power steering mechanism, a rear wheel turning angle ratio, which is the ratio of the rear wheel turning angle to the front wheel turning angle, being changed on the basis of a selected rear wheel turning angle characteristic curve of a plurality of rear wheel turning angle ratio characteristic curves, said front and rear wheel turning system further comprising:
a first failure detecting means which detects a failure of the power steering mechanism and,
a rear wheel turning angle ratio characteristic changing means which determines which rear wheel turning angle ratio characteristic curve is selected from the plurality of curves when the power steering mechanism fails;

a second failure detecting means which detects a failure of the rear wheel turning mechanism and, an assisting force changing means which changes the assisting force of the power steering mechanism when the rear wheel turning mechanism fails.

14. The front and rear wheel turning system of claim 13, wherein the power steering mechanism includes a hydraulic system, and the rear wheel turning assisting means comprises an electronic system.

15. The front and rear wheel turning system of claim 14, wherein the rear wheel turning assisting means includes a servomotor.

16. A four-wheel steering system for a vehicle comprising a front wheel turning mechanism which turns a front wheel in response to the turning of a steering wheel so that the turning angle of the front wheel turning mechanism is directly proportional to the rotational angle of the steering wheel, a rear wheel turning mechanism which turns a rear wheel in response to the turning of the steering wheel, and a power steering mechanism for providing an assisting force for assisting the front wheel turning mechanism in turning the front wheel at a turning angle which is directly proportional to the rotational angle of the steering wheel such that the assisting force eases turning of the steering wheel while the directly proportional relationship between the turning angle of the front wheel and the rotational angle of the steering wheel is maintained, a rear wheel turning angle ratio, which is the ratio of the rear wheel turning angle to the front wheel turning angle, being changed on the basis of predetermined rear wheel turning angle ratio characteristic curves, said four-wheel steering system further comprising:

a failure detecting means which detects failure of the rear wheel turning mechanism and an assisting force changing means which changes the assisting force of the power steering mechanism when the rear wheel turning mechanism fails.

17. A four-wheel steering system for a vehicle comprising a front wheel turning mechanism which turns a front wheel in response to the turning of a steering wheel so that the turning angle of the front wheel turning mechanism is directly proportional to the rotational angle of the steering wheel, a rear wheel turning mechanism which turns a rear wheel in response to the turning of the steering wheel, and a power steering mechanism, a rear wheel turning angle ratio, which is the ratio of the rear wheel turning angle to the front wheel turning angle, being changed on the basis of a selected rear wheel turning angle characteristic curve of a plurality of rear wheel turning angle ratio characteristic curves, the four-wheel steering system further comprising a failure detecting means which detects failure of the rear wheel turning mechanism and a rear wheel turning angle ratio characteristic changing means which determines which rear wheel turning angle ratio characteristic curve is selected from the plurality of curves when the power steering mechanism fails.

* * * * *